(12) United States Patent
Freling et al.

(10) Patent No.: US 10,775,045 B2
(45) Date of Patent: Sep. 15, 2020

(54) ARTICLE HAVING MULTI-LAYERED COATING

(71) Applicant: United Technologies Corporation, Farmington, CT (US)

(72) Inventors: Melvin Freling, West Hartford, CT (US); Jessica L. Serra, Manchester, CT (US); Paul H. Zajchowski, Enfield, CT (US); Craig L. Ostrout, Ellington, CT (US); Brian T. Hazel, Avon, CT (US); Mario P. Bochiechio, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 428 days.

(21) Appl. No.: 15/115,741

(22) PCT Filed: Jan. 9, 2015

(86) PCT No.: PCT/US2015/010750
§ 371 (c)(1),
(2) Date: Aug. 1, 2016

(87) PCT Pub. No.: WO2015/142411
PCT Pub. Date: Sep. 24, 2015

(65) Prior Publication Data
US 2017/0176007 A1 Jun. 22, 2017

Related U.S. Application Data

(60) Provisional application No. 61/937,013, filed on Feb. 7, 2014.

(51) Int. Cl.
*F23R 3/00* (2006.01)
*F23M 5/00* (2006.01)
(Continued)

(52) U.S. Cl.
CPC .............. *F23R 3/007* (2013.01); *C23C 4/073* (2016.01); *C23C 4/129* (2016.01); *F01D 5/284* (2013.01);
(Continued)

(58) Field of Classification Search
CPC .. F23R 3/002; F23R 3/007; F23R 3/42; F23R 3/46; F23R 2900/00018; C23C 4/02;
(Continued)

(56) References Cited

U.S. PATENT DOCUMENTS 4,696,855 A * 9/1987 Pettit, Jr. ................. B05B 7/226
427/201
5,059,095 A * 10/1991 Kushner ................... C23C 4/02
29/889.21

(Continued)

FOREIGN PATENT DOCUMENTS

| EP | 2641993 A2 | 9/2013 | |
|---|---|---|---|
| WO | WO-2012012431 A1 * | 1/2012 | ............... C09D 1/02 |
| WO | 2013021354 A2 | 2/2013 | |

OTHER PUBLICATIONS

International Search Report and Written Opinion for PCT Application No. PCT/US2015/010750 dated Oct. 21, 2015.
(Continued)

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

An article such as a heat shield panel includes a substrate and a multi-layered coating supported on the substrate. The multi-layered coating can include alternating layers of different ceramic material compositions having individual thicknesses of less than 25 micrometers.

16 Claims, 2 Drawing Sheets

(51) Int. Cl.
  *F01D 5/28* (2006.01)
  *F01D 25/00* (2006.01)
  *C23C 4/073* (2016.01)
  *C23C 4/129* (2016.01)
(52) U.S. Cl.
  CPC .......... *F01D 5/288* (2013.01); *F01D 25/005* (2013.01); *F23M 5/00* (2013.01); *F23R 3/002* (2013.01); *F05D 2240/11* (2013.01); *F05D 2300/182* (2013.01); *F05D 2300/2112* (2013.01); *F05D 2300/6033* (2013.01); *F23M 2900/05004* (2013.01); *F23R 2900/00018* (2013.01); *Y02T 50/672* (2013.01); *Y02T 50/6765* (2018.05)
(58) Field of Classification Search
  CPC ....... C23C 4/073; C23C 4/129; C23C 28/321; C23C 28/3215; F01D 5/284; F01D 5/288; F01D 25/005; F23M 5/00; F23M 2900/05004; F05D 2240/11; F05D 2300/182; F05D 2300/2112; F05D 2300/6033
  USPC .......................................................... 60/753
  See application file for complete search history.

(56) References Cited

U.S. PATENT DOCUMENTS

| | | | |
|---|---|---|---|
| 5,484,263 A | 1/1996 | Nagaraj et al. | |
| 5,576,885 A | 11/1996 | Lowe et al. | |
| 5,716,720 A | 2/1998 | Murphy | |
| 5,780,178 A * | 7/1998 | Jones | C01G 25/02 428/697 |
| 5,891,267 A | 4/1999 | Schaeffer et al. | |
| 6,021,152 A | 2/2000 | Olsen et al. | |
| 6,181,727 B1 | 1/2001 | Stowell et al. | |
| 6,652,987 B2 | 11/2003 | Allen et al. | |
| 8,147,922 B2 | 4/2012 | Skoog et al. | |
| 2003/0008170 A1 | 1/2003 | Allen et al. | |
| 2004/0123598 A1 | 7/2004 | Ackermann et al. | |
| 2004/0126599 A1 | 7/2004 | Wigren et al. | |
| 2007/0026214 A1 | 2/2007 | Bullock et al. | |
| 2007/0172703 A1 | 7/2007 | Freling et al. | |
| 2010/0136241 A1 | 6/2010 | Sclichting | |
| 2010/0154422 A1 | 6/2010 | Kirby et al. | |
| 2011/0151132 A1 * | 6/2011 | Nagaraj | F23R 3/007 427/454 |
| 2011/0319252 A1 * | 12/2011 | Schmidt | C04B 35/62892 501/2 |
| 2013/0260132 A1 | 10/2013 | Hazel et al. | |
| 2013/0269666 A1 | 10/2013 | McAlister | |
| 2014/0037903 A1 | 2/2014 | Rosenzweig et al. | |

OTHER PUBLICATIONS

Extended European Search Report. dated Feb. 28, 2018. Reference No. EP15764320.

International Preliminary Report on Patentability for PCT Application No. PCT/US2015/010750 dated Aug. 18, 2016.

* cited by examiner

ARTICLE HAVING MULTI-LAYERED COATING

CROSS-REFERENCE TO RELATED APPLICATION

This application claims priority to U.S. Provisional Application No. 61/937,013, filed Feb. 7, 2014.

BACKGROUND

A gas turbine engine typically includes at least a compressor section, a combustor section and a turbine section. Air entering the compressor section is compressed and delivered into the combustion section where it is mixed with fuel and ignited to generate a high-speed exhaust gas flow. The combustor can include heat shields to protect against the high temperatures generated in the combustion process.

SUMMARY

A combustor according to an example of the present disclosure includes a combustion chamber having a fuel injection portion and a heat shield panel bordering the combustion chamber. The heat shield panel includes a substrate and a multi-layered coating supported on the substrate.

In a further embodiment of any of the foregoing embodiments, the multi-layered coating includes alternating layers of different ceramic material compositions, and a bond coat between the multi-layered coating and the substrate.

In a further embodiment of any of the foregoing embodiments, the bond coat is selected from the group consisting of aluminide, platinum aluminide, MCrAlY, and MCrAlX, where M is at least one of nickel, cobalt, and iron and X is at least one of Zr, Hf, and Y.

In a further embodiment of any of the foregoing embodiments, the ceramic material compositions are oxides.

In a further embodiment of any of the foregoing embodiments, the multi-layered coating includes alternating layers of different ceramic material compositions selected from the group consisting of stabilized zirconia and stabilized hafnia, wherein the stabilized zirconia and stabilized hafnia is stabilized with 3-60 mol % of a stabilizing oxide of an element selected from the group consisting of Ca, Mg, Sc, Y, La, Ce, Pr, Nd, Sm Eu, Gd, Tb, Dy, Ho, Er, Tm, Tb, Lu, and combinations thereof.

In a further embodiment of any of the foregoing embodiments, the multi-layered coating includes layers having individual thicknesses of less than 25 micrometers.

In a further embodiment of any of the foregoing embodiments, the multi-layered coating includes layers having individual thicknesses of 0.1-2.5 micrometers.

In a further embodiment of any of the foregoing embodiments, the multi-layered coating includes layers having individual thicknesses of less than 25 micrometers, and a total thickness of 0.1-0.6 millimeters.

In a further embodiment of any of the foregoing embodiments, the heat shield panel is carried on at least one of a bulkhead that divides the combustion chamber into forward and aft sections, and a shell that bounds a radially inner or outer side of the combustion chamber.

An article according to an example of the present disclosure includes a substrate, a bond coat, and a multi-layered coating supported on the bond coat. The multi-layered coating includes alternating layers of different ceramic material compositions having individual thicknesses of less than 25 micrometers.

In a further embodiment of any of the foregoing embodiments, the bond coat is selected from the group consisting of aluminide, platinum aluminide, MCrAlY, and MCrAlX, where M is at least one of nickel, cobalt, and iron and X is at least one of Zr, Hf and Y.

In a further embodiment of any of the foregoing embodiments, the different ceramic material compositions are selected from the group consisting of oxides.

In a further embodiment of any of the foregoing embodiments, the multi-layered coating includes alternating layers of different ceramic material compositions selected from the group consisting of stabilized zirconia and stabilized hafnia, wherein the stabilized zirconia and stabilized hafnia are stabilized with 3-60 mol % of a stabilizing oxide of an element selected from the group consisting of Ca, Mg, Sc, Y, La, Ce, Pr, Nd, Sm Eu, Gd, Tb, Dy, Ho, Er, Tm, Tb, Lu, and combinations thereof.

In a further embodiment of any of the foregoing embodiments, the multi-layered coating includes layers having individual thicknesses of less than 25 micrometers.

In a further embodiment of any of the foregoing embodiments, the multi-layered coating includes layers having individual thicknesses of 0.1-2.5 micrometers.

In a further embodiment of any of the foregoing embodiments, the multi-layered coating includes layers having individual thicknesses of less than 25 micrometers, and a total thickness of 0.1-0.6 millimeters.

In a further embodiment of any of the foregoing embodiments, each of the alternating layers is continuous.

A method of fabricating an article according to an example of the present disclosure includes forming on a substrate a multi-layered coating of alternating layers of different ceramic material compositions. The layers have individual thicknesses of less than 25 micrometers.

A further embodiment of any of the foregoing embodiments includes forming the multi-layered coating by thermal co-spraying dry powders of two different ceramic material compositions.

A further embodiment of any of the foregoing embodiments includes forming the multi-layered coating using multiple thermal spray passes, wherein each single one of the passes co-deposits at least two continuous layers.

A further embodiment of any of the foregoing embodiments includes forming the multi-layered coating using at least one suspension solution that is injected into a thermal spray.

In a further embodiment of any of the foregoing embodiments, the at least one suspension solution includes a mixture of a carrier liquid and a powder of at least one of the different ceramic material compositions.

In a further embodiment of any of the foregoing embodiments, the at least one suspension solution includes a mixture of a carrier liquid and a metallic salt that converts in flight in the thermal spray to at least one of the different ceramic material compositions.

A further embodiment of any of the foregoing embodiments includes forming the multi-layered coating by thermal co-spraying suspension solutions of two different ceramic material compositions.

A further embodiment of any of the foregoing embodiments includes forming the multi-layered coating by thermal spraying a single mixed suspension solution of two different ceramic material compositions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
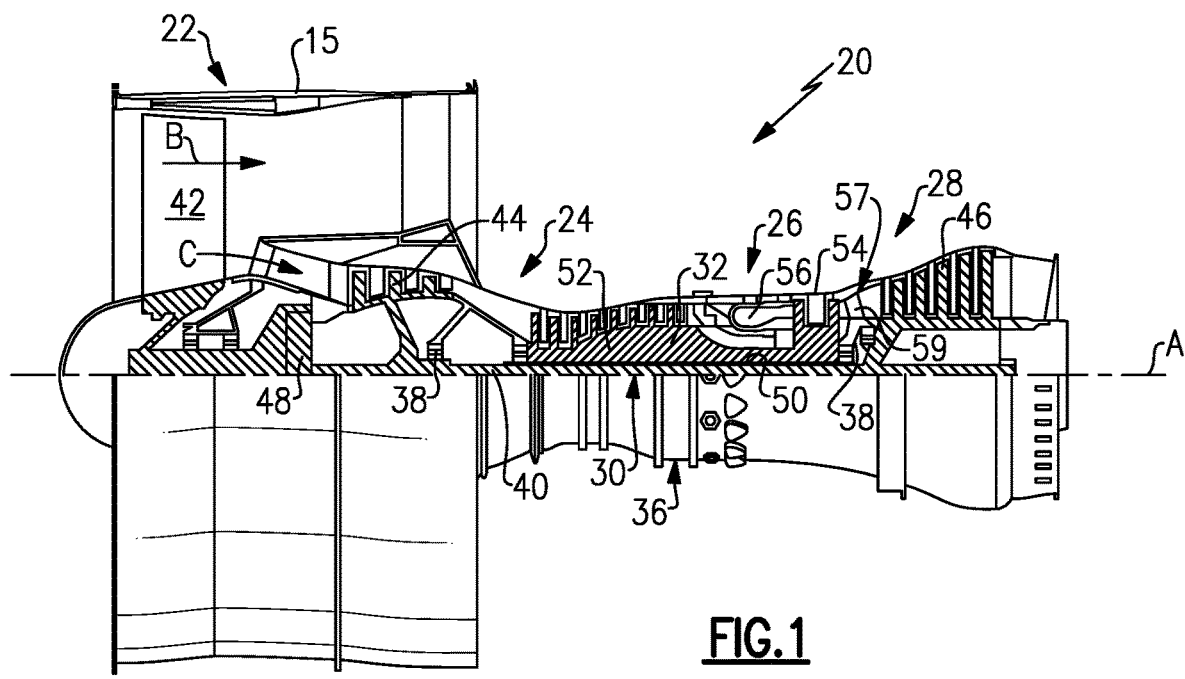
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
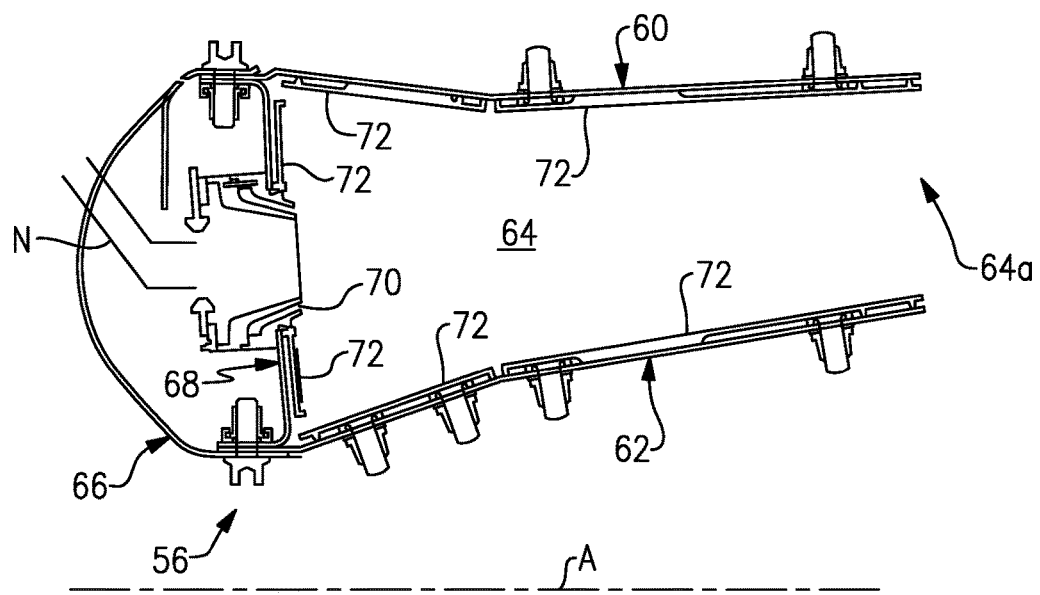
FIG. 2 illustrates a cross-section of a portion of the combustor of the gas turbine engine of FIG. 1.

FIG. 2 shows a sectioned view of a portion of the combustor 56, which in this example is an annular combustor, although this disclosure could also be applied to other types of combustor designs or components that are used under a high radiation condition. The combustor 56 is generally a 4-piece construction that includes an annular outer shell 60, an annular inner shell 62 that is radially inwardly spaced from the annular outer shell 60 to define an annular combustion chamber 64 there between, an annular hood 66 and a bulkhead 68 that divides the annular combustion chamber 64 and the annular hood 66. The annular combustor 56, and thus the annular outer shell 60, the annular inner shell 62, the annular hood 66 and the bulkhead 68, extends circumferentially around the engine central longitudinal axis A.

The annular combustor 56 receives a fuel supply through a fuel nozzle N and air is provided through a swirler 70. The nozzle, or the nozzle and the swirler 70, can be considered to be a fuel injection portion of the combustor 56. The annular outer shell 60, the annular inner shell 62, the bulkhead 68 each include heat shield panels 72 for protecting the annular combustor 56 from the relatively high temperatures generated within the combustion chamber 64. Although each of the annular outer shell 60, the annular inner shell 62, and the bulkhead 68 are shown with the heat shield panels 72, it is to be understood that any of these components could alternatively exclude the heat shield panel 72 or could use a conventional panel in combination with the heat shield panel 72. A flow of hot combustion gases is ejected out of an aft end 64a of the annular combustion chamber 64 in a known manner. It is to be understood that relative positional terms, such as "forward," "aft," "inner," "outer," and the like are relative to the central axis A and the normal operational attitude of the gas turbine engine 20, and should not be considered otherwise limiting.

Figure 3:
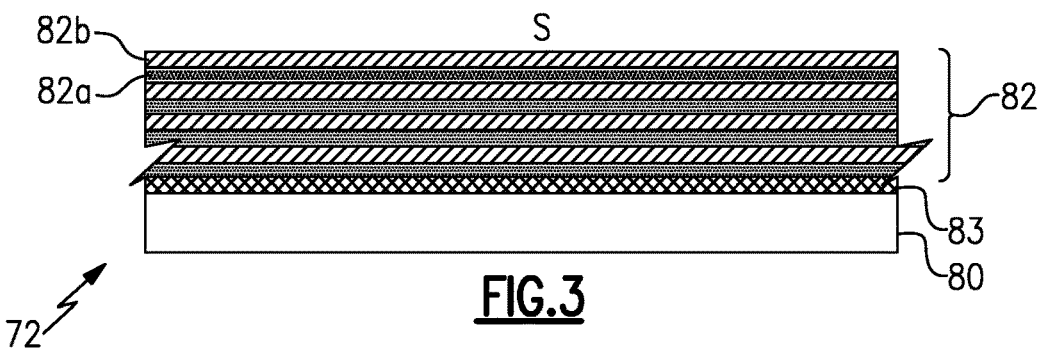
FIG. 3 illustrates a representative portion of a heat shield panel that can be used in the combustor of FIG. 2.

FIG. 3 shows a representative cross-section of one of the heat shield panels 72, where side S faces the combustion chamber 64. It is to be understood that the heat shield panel 72 is one example article and that the examples herein can also be applied to other articles that are exposed to high temperatures or that are in the line of sight of combustion to receive infrared radiation. Downstream from the combustor 56, first stage vanes, blades, blade outer air seals, and the like may also be in the line of sight of radiation from the combustor 56 and may also thus benefit from the examples herein.

In this example, the heat shield panel 72 includes a substrate 80 and a multi-layered coating 82 supported on the substrate 80. In this example, a bond coat 83 is used between the substrate 80 and the multi-layered coating 82. The bond coat 83 can include an aluminide, platinum aluminide, MCrAlY, where M is Ni, Co, NiCo, or Fe, NiAlCrZr, or other suitable alternative. The substrate 80 can be a metallic alloy, such as a nickel- or cobalt-based superalloy, but is not limited to superalloys or metallic alloys. In further examples, the substrate could alternatively be a ceramic-based material, such as, but not limited to, a ceramic matrix composite. An example ceramic matrix composite includes silicon carbide fibers dispersed in a silicon carbide matrix.

The multi-layered coating 82 includes alternating layers 82a and 82b of different ceramic material compositions. The ceramic material compositions are thermally resistant and, in the multi-layer coating 82, are arranged with an individual layer thickness and geometry that facilitates thermal radiation scattering and reflection to protect the underlying substrate 80 from the relatively high temperatures in the combustor chamber 64.

The ceramic material compositions of the alternating layers 82a and 82b can be oxide ceramic material compositions, nitride ceramic material compositions, or combinations thereof. If nitride ceramic material compositions are used, nitride layers can be "sealed" among oxide layers to protect the nitride layers from environmental conditions. In one further example, the layers 82a and 82b are different compositions of stabilized zirconia or stabilized hafnia. For example, the zirconia or hafnia is stabilized with 3-60 mol % of a stabilizing oxide. In further examples, the stabilizing oxide includes one or more of Ca, Mg, Sc, Y, La, Ce, Pr, Nd, Sm Eu, Gd, Tb, Dy, Ho, Er, Tm, Tb, and Lu. In additional examples, the layers 82a are yttria-stabilized zirconia and the layers 82b are rare earth oxide-stabilized zirconia. For example, the rare earth oxide can be based on one or more of the rare earth metals Y, La, Ce, Pr, Nd, Sm Eu, Gd, Tb, Dy, Ho, Er, Tm, Tb, and Lu. In one further example, the layers 82a and 82b have nominally equivalent thicknesses. That is, the layers 82a and 82b have, by design, equivalent thicknesses, although the actual thicknesses may vary due to fabrication tolerances.

The alternating layers 82a and 82b are relatively thin and, due to the different ceramic material compositions, have differing refractive indices. The relative thinness of the layers 82a and 82b in combination with the different refractive indices facilitates scattering of thermal radiation in the combustor 56. For example, the individual layers 82a and 82b each have a thickness of less than 25 micrometers and, in a further example, each have a thickness of 10-15 micrometers. In one further example, a total thickness of the multi-layered coating 82 is 0.1-0.6 millimeters. Although a limited number of the layers 82a and 82b are shown in FIG. 3, it is to be understood that fewer or additional layers 82a and 82b can be used. For example, given the above-example total thickness of the multi-layered coating 82 and individual layer thicknesses of 10-15 micrometers, the multi-layered coating 82 could include between 6 and 60 total layers.

In further examples, the individual layers 82a and 82b each have a thickness that is about ¼ of the wavelength of incident radiation received by the heat shield panel 72 or other article. The layers 82a and 82b at least partially reflect incident radiation at each layer interface such that the radiation, or a substantial portion thereof, does not reach the underlying substrate 80.

Figure 4:
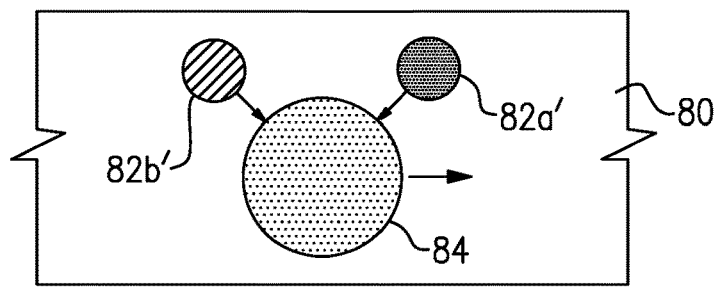
FIG. 4 illustrates an example method of fabricating a heat shield panel by thermal co-spraying of two different powders.
Figure 5:
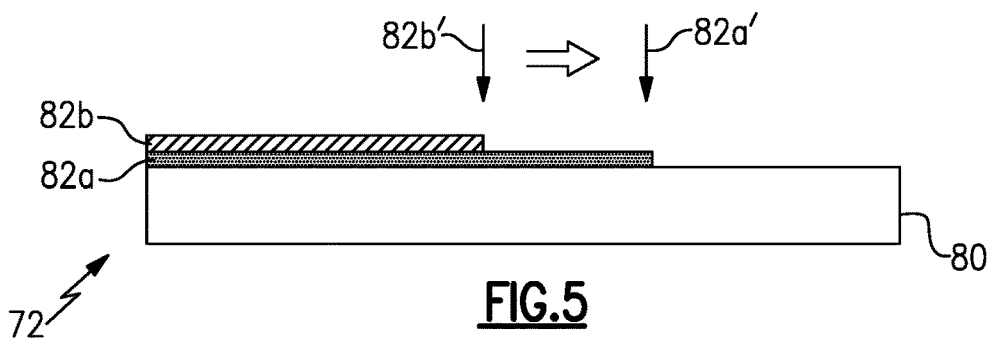
FIGS. 5 and 6 illustrate thermal spray passes in which at least two layers are co-deposited on top of one another.
Figure 6:
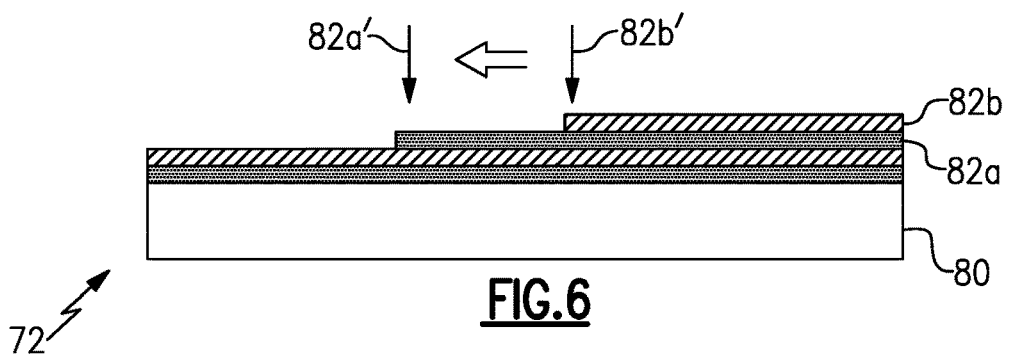

FIGS. 4, 5, and 6 depict an example method of fabricating the multi-layer coating 82. In this example, the method includes forming the multi-layered coating 82 by thermal co-spraying of dry powders, which are represented at 82a' and 82b'. Thermal spraying can include plasma spraying, flame spraying, or high velocity oxy-fuel spraying, but is not limited to these thermal spray techniques. The dry powders 82a' and 82b' are introduced adjacent a plasma plume 84 at different circumferential locations around the periphery of the plume 84. In this example, the dry powder 82a' is introduced at approximately a two o'clock position and the dry powder 82b' is introduced at approximately a ten o'clock position. Without being bound to any particular theory, each of the dry powders 82a' and 82b' remain primarily at the perimeter of the plume 84. In this regard, a relatively fine particle size of the powders 82a' and 82b' can be used to avoid entraining the dry powders 82a' and 82b' in the plume 84 during the deposition process. In one example, the dry powders 82a' and 82b' each have an average particle size of 1-20 micrometers.

Whereas the view in FIG. 4 is looking down toward the substrate 80, the view shown in FIG. 5 is from the side. The layers 82a and 82b can be co-sprayed onto the substrate 80 in multiple thermal spray passes. In this regard, in a first pass shown in FIG. 5, the plume and dry powders 82a' and 82b' are moved across the substrate 80 such that the dry powder 82a' first deposits onto the substrate 80 and the dry powder 82b' subsequently deposits on top of the deposited layer 82a. Upon reaching the end of the substrate 80, or other predetermined location, a second pass over the already-deposited layers 82a and 82b can be conducted, as depicted in FIG. 6. In this second pass, the dry powder 82a' deposits on top of the previously deposited layer 82b, and the dry powder 82b' deposits as another layer 82b on top of the just-deposited layer 82a. The cycles or passes can be repeated as desired until a selected total thickness of the multi-layered coating 82 is reached. The feed rate of the dry powders 82a' and 82b' can also be controlled to control the individual thickness of the layers 82a and 82b.

The above technique permits deposition of layers 82a and 82b with thickness of about 10-25 micrometers or greater. For thinner layers 82a and 82b, a suspension solution technique can be used instead of the dry powder technique. The suspension solution technique includes mixing one or more suspension solutions having one or more powders or precursors of the different ceramic material compositions in one or more liquid carriers. The suspension solution or solutions can then be injected, individually or co-injected, into the thermal spray, similar to the dry powder injection described above, to deposit multiple, continuous discrete layers 82a and 82b. The powder or powders can have an average particle size of 10 nanometers to 1 micrometer, which allows deposition of thinner layers 82a and 82b in the thickness ranges described elsewhere herein. The suspension solution or solutions can be continually or semi-continually agitated to maintain dispersion and avoid settling of the powder in the liquid carrier. In one further example, the suspension solution can include, but is not limited to, a loading, by weight, of 5-50% of the powder.

The suspension solution can be applied using any of three different methods. A first method can include using discrete individual passes, wherein a first pass is made with the first suspension solution and then a second pass is made with a second suspension solution. This will produce continuous layers of thickness ranging from ~1-10 microns thickness. A second method can include co-spraying of both suspension solutions at the same time from two separate injectors at different locations relative the plasma plume. Each injection stream will break up to a distinctive droplet size (likely constituting multiple powder particles in the case of a suspension) that will deposit as an individual splat independent of the other material. This will produce discontinuous layering on the splat size scale which can be ~0.25-2 microns thickness. A third method can include mixing and spraying as a blended suspension solution from a single injector. This mixes the materials on the size scale of the powder particle or precursor molecule. The injected stream will break up to a distinctive droplet which will contain a combination of both materials. This will produce discontinuous layering on the particle or molecule size scale, which can be <1 micron thickness.

In another example, one or more of the suspension solutions can include a precursor rather than, or in addition to, the powder. For example, the precursor can be a metal salt. Example metal salts can include, but are not limited to, nitrates, chlorides, acetates, propionates, other salts, or combinations thereof that are soluble in the selected liquid carrier (solvent), such as alcohol and/or water. The metal salt reduces and oxidizes in flight after injection of the solution into the thermal spray, to deposit the desired oxide ceramic composition. The suspension solution can include, but is not limited to, a loading, by weight, of 10-50% of the metal salt.

In a further example, a single liquid solution can include multiple powders or different ceramic material compositions. The liquid solution can then be injected into the thermal spray to deposit the powders. In this example, the layers 82a and 82b will be locally/microscopically layered with respect to elongated "splat" regions of the individual powder particles on one another but will be macroscopically discontinuous.

In a further example, a liquid solution containing a single or multiple powders can be mixed with a solution containing a metal salts. Such that the particulate and metal salt are deposited simultaneously onto the substrate. In this this example, the layers 82a and 82b will be locally/microscopically layers with the respect to the elongated "splat" regions of the individual powder particles on one another, but with be macroscopically discontinuous.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A combustor comprising:
    a combustion chamber having a fuel injection portion; and
    a heat shield panel bordering the combustion chamber, the heat shield panel including a substrate and a multi-layered coating supported on the substrate, the multi-layered coating including, for thermal radiation scattering and reflection, alternating back-to-back layers of different ceramic material compositions selected from the group consisting of stabilized zirconia and stabilized hafnia, wherein the stabilized zirconia and stabilized hafnia is stabilized with 3-60 mol % of a stabilizing oxide of an element selected from the group consisting of Ca, Mg, and combinations thereof, and the layers of the multi-layered coating each have an individual thickness of less than 25 micrometers.

2. The combustor as recited in claim 1, further comprising a bond coat between the multi-layered coating and the substrate.

3. The combustor as recited in claim 2, wherein the bond coat is MCrAlX, where M is at least one of nickel, cobalt, and iron and X is at least one of Zr, Hf, and Y.

4. The combustor as recited in claim 1, wherein the individual thicknesses are 0.1-2.5 micrometers.

5. The combustor as recited in claim 1, wherein the multi-layered coating has a total thickness of 0.1 -0.6 millimeters.

6. The combustor as recited in claim 1, wherein the heat shield panel is carried on at least one of:
    a bulkhead that divides the combustion chamber into forward and aft sections, and
    a shell that bounds a radially inner or outer side of the combustion chamber.

7. The combustor as recited in claim 1, wherein the element is Ca.

8. The combustor as recited in claim 1, wherein the element in Mg.

9. A method of fabricating heat shield panel for a combustor, the method comprising:
    fabricating the heat shield panel of the combustor by forming on a substrate a multi-layered coating that has, for thermal radiation scattering and reflection, alternating back-to-back layers of different ceramic material compositions selected from the group consisting of stabilized zirconia and stabilized hafnia, wherein the stabilized zirconia and stabilized hafnia is stabilized with 3-60 mol % of a stabilizing oxide of an element selected from the group consisting of Ca, Mg, and combinations thereof, and the layers of the multi-layered coating each have an individual thickness of less than 25 micrometers.

10. The method as recited in claim 9, including forming the multi-layered coating by thermal co-spraying dry powders of two different ceramic material compositions.

11. The method as recited in claim 9, including forming the multi-layered coating using multiple thermal spray passes, wherein each single one of the passes co-deposits at least two continuous layers.

12. The method as recited in claim 9, including forming the multi-layered coating using at least one suspension solution that is injected into a thermal spray.

13. The method as recited in claim 12, wherein the at least one suspension solution includes a mixture of a carrier liquid and a powder of at least one of the different ceramic material compositions.

14. The method as recited in claim 12, wherein the at least one suspension solution includes a mixture of a carrier liquid and a metallic salt that converts in flight in the thermal spray to at least one of the different ceramic material compositions.

15. The method as recited in claim 9, including forming the multi-layered coating by thermal co-spraying suspension solutions of two different ceramic material compositions.

16. The method as recited in claim 9, including forming the multi-layered coating by thermal spraying a single mixed suspension solution of two different ceramic material compositions.

* * * * *